(12) United States Patent
Burns, Jr. et al.

(10) Patent No.: US 8,363,805 B2
(45) Date of Patent: Jan. 29, 2013

(54) MEDIA TERMINAL ADAPTER (MTA) INITIALIZATION PROCESS DISPLAY BY USE OF AN EMBEDDED CALLER NAME AND CALLER IDENTIFICATION

(76) Inventors: James M. Burns, Jr., Dacula, GA (US); Bryan W. Scholes, Cumming, GA (US)

(*) Notice: Subject to any disclaimer, the term of this patent is extended or adjusted under 35 U.S.C. 154(b) by 1491 days.

(21) Appl. No.: 11/425,862

(22) Filed: Jun. 22, 2006

(65) Prior Publication Data

US 2007/0297384 A1 Dec. 27, 2007

(51) Int. Cl.
*H04M 1/60* (2006.01)
*H04B 1/38* (2006.01)

(52) U.S. Cl. .................. 379/167.13; 455/557

(58) Field of Classification Search .......... 379/1.01, 379/15.03, 29.1, 31, 177, 164, 251, 373; 455/404.1; 370/241
See application file for complete search history.

(56) References Cited

U.S. PATENT DOCUMENTS

| | | | |
|---|---|---|---|
| 5,544,235 A * | 8/1996 | Ardon | 379/177 |
| 5,546,447 A | 8/1996 | Skarbo et al. | |
| 5,684,988 A | 11/1997 | Pitchaikani et al. | |
| 5,699,419 A * | 12/1997 | Ardon | 379/156 |
| 5,799,060 A | 8/1998 | Kennedy et al. | |
| 5,937,034 A | 8/1999 | Kennedy et al. | |
| 6,005,921 A | 12/1999 | Keefe et al. | |
| 6,324,263 B1 | 11/2001 | Sherwood et al. | |
| 6,898,274 B1 | 5/2005 | Galt et al. | |
| 6,937,713 B1 | 8/2005 | Kung et al. | |
| 6,940,866 B1 | 9/2005 | Miller et al. | |
| 6,985,492 B1 | 1/2006 | Thi et al. | |
| 7,002,995 B2 | 2/2006 | Chow et al. | |
| 7,006,479 B1 | 2/2006 | Joo et al. | |
| 7,010,002 B2 | 3/2006 | Chow et al. | |
| 7,068,757 B1 | 6/2006 | Burnett | |
| 7,103,067 B1 | 9/2006 | Singh et al. | |
| 7,116,771 B2 | 10/2006 | Charania et al. | |

(Continued)

FOREIGN PATENT DOCUMENTS

CN 1108449 A 5/2003
CN 1711744 A 12/2005

(Continued)

OTHER PUBLICATIONS

"Access and Terminals (AT); IPCablecom Access Network; End to End Provisioning for the IPAT Architecture (Between the eMTA to the V5.2 Interface); ETSI TR 102 305," ETSI Standards, European Telecommunications Standards Institute, Sophia-Antipo, FR, vol. AT-Digital, No. V111, Mar. 2004, XPO14015619 ISSN: 0000-0001; p. 15-17, line 18, p. 31.

(Continued)

*Primary Examiner* — Fan Tsang
*Assistant Examiner* — Solomon Bezuayehu
(74) *Attorney, Agent, or Firm* — Merchant & Gould

(57) ABSTRACT

Systems and methods are disclosed for a media terminal adapter (MTA) that gathers and reports steps of an initialization process as well as other information. The MTA tracks each completed step via a state machine and subsequently converts the steps and other information into an FSK format. FSK data is then provided to either a Type 1 or Type II caller identification telephone, or other caller identification box that includes a caller identification display, or a coupled handheld display device. Additionally, the MTA may also convert the completed steps into an audio wave file that is then transmitted to a connected telephone or an internal speaker.

22 Claims, 4 Drawing Sheets

U.S. PATENT DOCUMENTS

| | | | |
|---|---|---|---|
| 7,123,692 | B2 | 10/2006 | Atkinson et al. |
| 7,145,887 | B1 | 12/2006 | Akgun et al. |
| 7,263,111 | B1 | 8/2007 | Davis et al. |
| 7,280,532 | B2 | 10/2007 | Um |
| 7,295,566 | B1 | 11/2007 | Chiu et al. |
| 7,333,492 | B2 | 2/2008 | Wu et al. |
| 7,447,780 | B2 | 11/2008 | McMahon et al. |
| 7,502,457 | B2 | 3/2009 | McBlain et al. |
| 7,505,759 | B1 * | 3/2009 | Rahman .............. 455/412.2 |
| 7,701,954 | B2 | 4/2010 | Rabenko et al. |
| 7,860,230 | B2 | 12/2010 | Martin |
| 8,233,491 | B2 | 7/2012 | Burns |
| 2001/0055376 | A1 | 12/2001 | Karas |
| 2002/0064259 | A1* | 5/2002 | Tsai .................. 379/106.01 |
| 2002/0106017 | A1 | 8/2002 | Dombkowski et al. |
| 2002/0114431 | A1 | 8/2002 | McBride et al. |
| 2002/0150081 | A1 | 10/2002 | Fang |
| 2003/0007617 | A1 | 1/2003 | McAlinden |
| 2003/0108176 | A1 | 6/2003 | Kung et al. |
| 2004/0008724 | A1 | 1/2004 | Devine et al. |
| 2004/0028208 | A1 | 2/2004 | Carnazza et al. |
| 2004/0066913 | A1 | 4/2004 | Kennedy et al. |
| 2004/0090968 | A1 | 5/2004 | Kimber et al. |
| 2004/0114747 | A1 | 6/2004 | Trandal et al. |
| 2004/0170268 | A1 | 9/2004 | Hakusui |
| 2004/0208177 | A1 | 10/2004 | Ogawa |
| 2004/0249927 | A1 | 12/2004 | Pezutti |
| 2005/0018651 | A1 | 1/2005 | Yan et al. |
| 2005/0047423 | A1 | 3/2005 | Kaul et al. |
| 2005/0078689 | A1 | 4/2005 | Sharma et al. |
| 2005/0114518 | A1 | 5/2005 | McMahon et al. |
| 2005/0180393 | A1 | 8/2005 | Skubisz |
| 2005/0190891 | A1 | 9/2005 | Shah et al. |
| 2005/0198391 | A1 | 9/2005 | Coldren |
| 2005/0216949 | A1 | 9/2005 | Candelora et al. |
| 2006/0285487 | A1 | 12/2006 | Yasuie et al. |
| 2006/0291643 | A1 | 12/2006 | Pfaff et al. |
| 2007/0133516 | A1 | 6/2007 | Stein |
| 2007/0133776 | A1 | 6/2007 | Jain et al. |
| 2007/0140445 | A1 | 6/2007 | Ito |
| 2007/0198681 | A1 | 8/2007 | Bakke et al. |
| 2007/0201473 | A1 | 8/2007 | Bhatia et al. |
| 2007/0201481 | A1 | 8/2007 | Bhatia et al. |
| 2007/0218866 | A1* | 9/2007 | MacIver et al. .......... 455/404.1 |
| 2007/0274213 | A1 | 11/2007 | Stephan et al. |
| 2008/0043927 | A1* | 2/2008 | Lysaght et al. .............. 379/21 |
| 2008/0043970 | A1 | 2/2008 | Scholes et al. |
| 2008/0080680 | A1 | 4/2008 | Burns |
| 2008/0080690 | A1 | 4/2008 | Burns |
| 2008/0123627 | A1 | 5/2008 | Moreman et al. |
| 2008/0168517 | A1 | 7/2008 | Allen |
| 2009/0143013 | A1 | 6/2009 | Hatano et al. |
| 2009/0185665 | A1 | 7/2009 | Chen |

FOREIGN PATENT DOCUMENTS

| | | |
|---|---|---|
| WO | WO 03028355 | 4/2003 |
| WO | WO 03/077509 | 9/2003 |
| WO | WO2004/045130 | 5/2004 |
| WO | WO 2004045130 A2 * | 5/2004 |
| WO | WO 2006/015013 A2 | 2/2006 |
| WO | WO 2007/149708 A2 | 12/2007 |
| WO | WO 2008/016864 | 2/2008 |
| WO | WO 2008/039719 A2 | 4/2008 |
| WO | WO 2008/039721 A2 | 4/2008 |
| WO | WO 2008/042636 A2 | 4/2008 |

OTHER PUBLICATIONS

Gordon Beacham Motorola et al., "Network Control Signaling (NCS) Signaling MIB for PacketCable and IPCablecom Multimedia Terminal Adapters (MTAs); draft-ietf-ipcdn-pktc-signaling-02.txt;" IETF Standard-Working-Draft; Internet Engineering Task Force, IETF, CH, vol. ipcdn, No. 2, Oct. 2003, XP015019953 ISSN: 0000-0004; p. 3, p. 27.

Eugene Nechamkin Broadcom Corp, Jean-Francois Mule Cablelabs: "Multimedia Terminal Adapter (MTA) Management Information Base for PacketCable and IPCablecom compliant devices; draft-ietf-ipcdn-pktc-mtamib-06.txt;" IETF Standard-Working-Draft, Internet Engineering Task Force, IETF, CH, vol. ipcdn, No. 6, Jan. 21, 2005, XP015019952, ISSN: 0000-0004, pp. 5-7, p. 28, line 29.

U.S. Appl. No. 11/461,487, filed Aug. 1, 2006, Entitled "Media Terminal Adapter Routing of Telephone Calls Based on Caller Identification Information," Inventors: Scholes et al.

U.S. Appl. No. 11/536,727, filed Sep. 29, 2006, Entitled "Media Terminal Adapter Local Ringback Option," Inventors: Burns, James M.

U.S. Appl. No. 11/536,024, filed Sep. 28, 2006, Entitled "Embedded Media Terminal Adapter Endpoint Redirect Mode," Inventor: Burns, James M.

U.S. Appl. No. 11/535,201, filed Sep. 26, 2006, Entitled "Media Terminal Adapter with Session Initiation Protocol (SIP) Proxy," Inventors: Moreman, et al.

U.S. Office Action dated Jan. 13, 2011 cited in U.S. Appl. No. 11/536,024.

Canadian Office Action dated Feb. 10, 2012 cited in Application No. 2,659,639, 3 pgs.

Chinese First Office Action dated Mar. 16, 2011 cited in Application No. 200780023103.8.

U.S. Office Action dated Apr. 28, 2011 cited in U.S. Appl. No. 11/461,487.

Chinese Second Office Action dated Feb. 13, 2012 cited in Application No. 200780023103.8, 10 pgs.

Luan Dang, Cullen Jennings, David Kelly—Practical VOIP using VOCAL, 2002.

RFC 3015.

RFC 2543.

James Dahl Cable Television Laboratories et al., "Draft New Recommendation J.ipc2arch," ITU-T Draft Study Period 2005-2008, International Telecommunication Union, Geneva, CH, vol. Study Group 9, Aug. 2005, pp. 1-38.

Fred Baker Bill Foster Chip Sharp: "Cisco Architecture for Lawful Intercept in IP Networks; draft-baker-slem-architecture-02.txt;" IETF Standard-Working-Draft, Internet Engineering Task Force, IETF, CH, No. 2, Oct. 2003, XP015010527 ISSN: 0000-0004, p. 5-p. 13.

Baker Cisco Systems F: "Cisco Lawful Intercept Control MIB draft-baker-slem-mib-00; draft-baker-slem-mib-00.txt" IETF Standard-Working-Draft, Internet Engineering Task Force, IETF, CH, Apr. 2003, XP015000178 ISSN: 0000-0004, pp. 9, 23, 33.

International Search Report and Written Opinion mailed Dec. 28, 2007 cited in Application No. PCT/US2007/070692.

International Search Report and Written Opinion mailed Dec. 28, 2007 cited in Application No. PCT/US2007/074688.

International Search Report and Written Opinion dated Mar. 10, 2008 cited in PCT/US2007/079313.

International Search Report and Written Opinion mailed Mar. 18, 2008 cited in PCT/US2007/079309.

International Search Report and Written Opinion mailed Mar. 25, 2008 cited in PCT/US2007/079307.

European Communication dated Jun. 4, 2009 cited in Application No. 07 798 275 9.

European Communication dated Sep. 30, 2009 cited in Application No. 07 853 604.2.

International Preliminary Report on Patentability mailed Mar. 10, 2010 cited in PCT/US2007/079313.

European Communication dated Apr. 9, 2010 cited in Application No. 07 853 608.3.

U.S. Official Action dated Dec. 20, 2007 in U.S. Appl. No. 11/535,201.

U.S. Official Action dated Jun. 13, 2008 in U.S. Appl. No. 11/535,201.

U.S. Official Action dated Oct. 16, 2008 in U.S. Appl. No. 11/535,201.

U.S. Official Action dated Mar. 5, 2009 in U.S. Appl. No. 11/535,201.

U.S. Official Action dated Sep. 4, 2009 in U.S. Appl. No. 11/535,201.

U.S. Official Action dated Dec. 10, 2009 in U.S. Appl. No. 11/461,487.

U.S. Official Action dated Mar. 29, 2010 in U.S. Appl. No. 11/536,024.

U.S. Official Action dated May 24, 2010 in U.S. Appl. No. 11/461,487.
U.S. Official Action dated Jun. 7, 2010 in U.S. Appl. No. 11/536,727.
U.S. Official Action dated Aug. 16, 2010 in U.S. Appl. No. 11/536,024.
Chinese Third Office Action dated Jul. 25, 2012 cited in Application No. 200780023103.8, 16 pgs.
U.S. Final Office Action dated Aug. 11, 2011 cited in U.S. Appl. No. 11/536,727.
U.S. Final Office Action dated Sep. 2, 2011 cited in U.S. Appl. No. 11/461,487.
Canadian Office Action dated Jan. 27, 2011 cited in Application No. 2,655,422.
U.S. Office Action dated Mar. 4, 2011 cited in U.S. Appl. No. 11/536,727.
Canadian Office Action dated Jun. 21, 2012 cited in Application No. 2,655,422, 2 pgs.
Canadian Office Action dated Sep. 8, 2011 cited in Application No. 2,655,422.
U.S. Final Office Action dated Nov. 16, 2010 cited in U.S. Appl. No. 11/536,727.
Canadian Office Action dated Mar. 25, 2011 cited in Application No. 2,659,639.
Canadian Office Action dated May 4, 2012 cited in Application No. 2,664,578, 5 pgs.
Canadian Office Action dated May 22, 2012 cited in Application No. 2,664,793, 2 pgs.
Canadian Office Action dated Jan. 31, 2012 cited in Application No. 2,655,422.
U.S. Final Office Action dated Jun. 22, 2011 cited in U.S. Appl. No. 11/536,024.
Canadian Office Action dated Aug. 1, 2012 cited in Application No. 2,664,706, 2 pgs.

* cited by examiner

MEDIA TERMINAL ADAPTER (MTA) INITIALIZATION PROCESS DISPLAY BY USE OF AN EMBEDDED CALLER NAME AND CALLER IDENTIFICATION

FIELD OF THE INVENTION

This invention relates in general to telephony systems over broadband, more specifically broadband over coaxial cable, and more particularly, to the field of enabling a media terminal adapter initialization process display by use of an embedded caller name and caller identification.

DESCRIPTION OF THE RELATED ART

Broadband communications systems, such as satellite and cable television systems, are now capable of providing many services in addition to broadcast audio/video signals over their existing systems. Some advanced services in a broadband communications system along with providing conventional cable television signals are telephony services, such as high-speed data and telephone. To support these services, cable modems and media terminal adapters are used in the subscriber's premises and have typically been coupled to coaxial cable in a communications network (CN). U.S. Pat. No. 6,161,011 to Loveless, the disclosure and teachings of which are incorporated herein by reference, shows an example of a hybrid fiber/coaxial (HFC) communications network that could be used to implement the present invention.

FIG. 1 is a block diagram of a communications system that is suitable for transmitting voice and data signals in a cable communications system. A technician or a customer installs a media terminal adapter (MTA) 110 at a customer's premises and then initializes the MTA with a central office 120 over a communications network 123, where the communications network may comprise fiber optical cable and coaxial cable as opposed to a traditional public switched telephone network (PSTN). The MTA 110 performs several steps during the initialization process. At any time, the MTA 110 may fail during initialization with a cable modem termination system (CMTS) 115 that is located in the central office 120. If a customer has a connected computer 125, a web page associated with the initialization process and the MTA 110 may be viewed to determine what state in the initialization process the MTA 110 is currently and where in the initialization process the MTA 110 may have failed. However, many times a customer is not connecting a computer but rather just connecting a telephone 130. In this case, the technician or customer is unable to determine the point of failure in the initialization process and therefore effectively troubleshoot initialization of the MTA 110.

Thus, there exists a need for a remote method and system to determine the progress of the MTA's initialization and the point of failure, if a failure occurs, without requiring a computer.

BRIEF DESCRIPTION OF THE DRAWINGS

The invention can be better understood with reference to the following drawings. The components in the drawings are not necessarily drawn to scale, emphasis instead being placed upon clearly illustrating the principles of the invention. In the drawings, like reference numerals designate corresponding parts throughout the several views.

DETAILED DESCRIPTION OF THE PREFERRED EMBODIMENT

Preferred embodiments of the invention can be understood in the context of a broadband communications system. Note, however, that the invention may be embodied in many different forms and should not be construed as limited to the embodiments set forth herein. All examples given herein, therefore, are intended to be non-limiting and are provided in order to help clarify the description of the invention.

The present invention is directed towards enabling a media terminal adapter (MTA) to report steps of an initialization process between the MTA and a CMTS as well as other information. More specifically, the MTA generates all or various steps of the initialization process or other information, such as the firmware and/or software version, and then transmits the information to a display on a connected telephone. A Type 1 or Type II caller identification telephone, or other caller identification box, which includes a display for caller identification name and number, is then used to receive and display the information. A handheld receiver is another option for displaying information generated by the MTA or information received from the CMTS, if a Type 1 or Type II caller identification telephone or other caller identification box is not available. The handheld receiver may be physically connected to the MTA through a connector or by using infrared (IR) technology. Furthermore, the MTA may also generate audio steps of the information that can then be audibly heard by a technician or a customer by either a connected telephone or a speaker included in the MTA.

Figure 1:
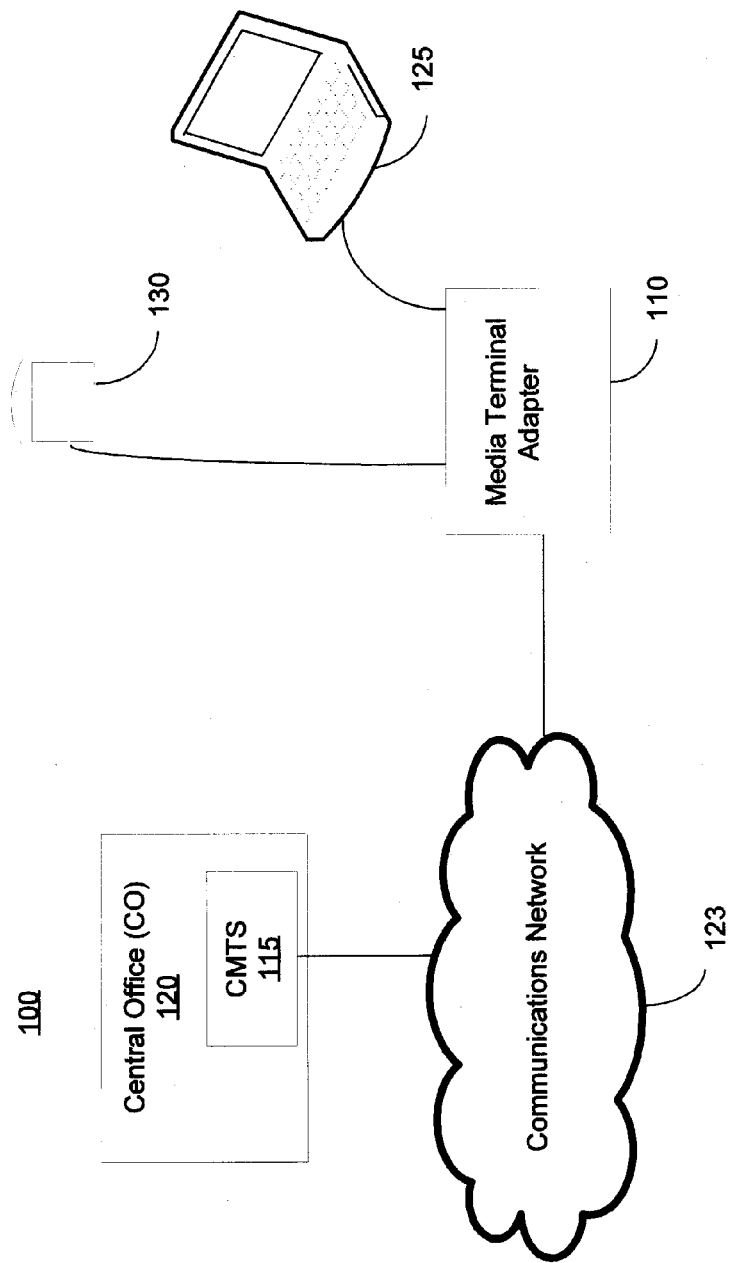
FIG. 1 is a block diagram of a communications system that is suitable for transmitting voice and data signals in a cable communications system.
Figure 2:
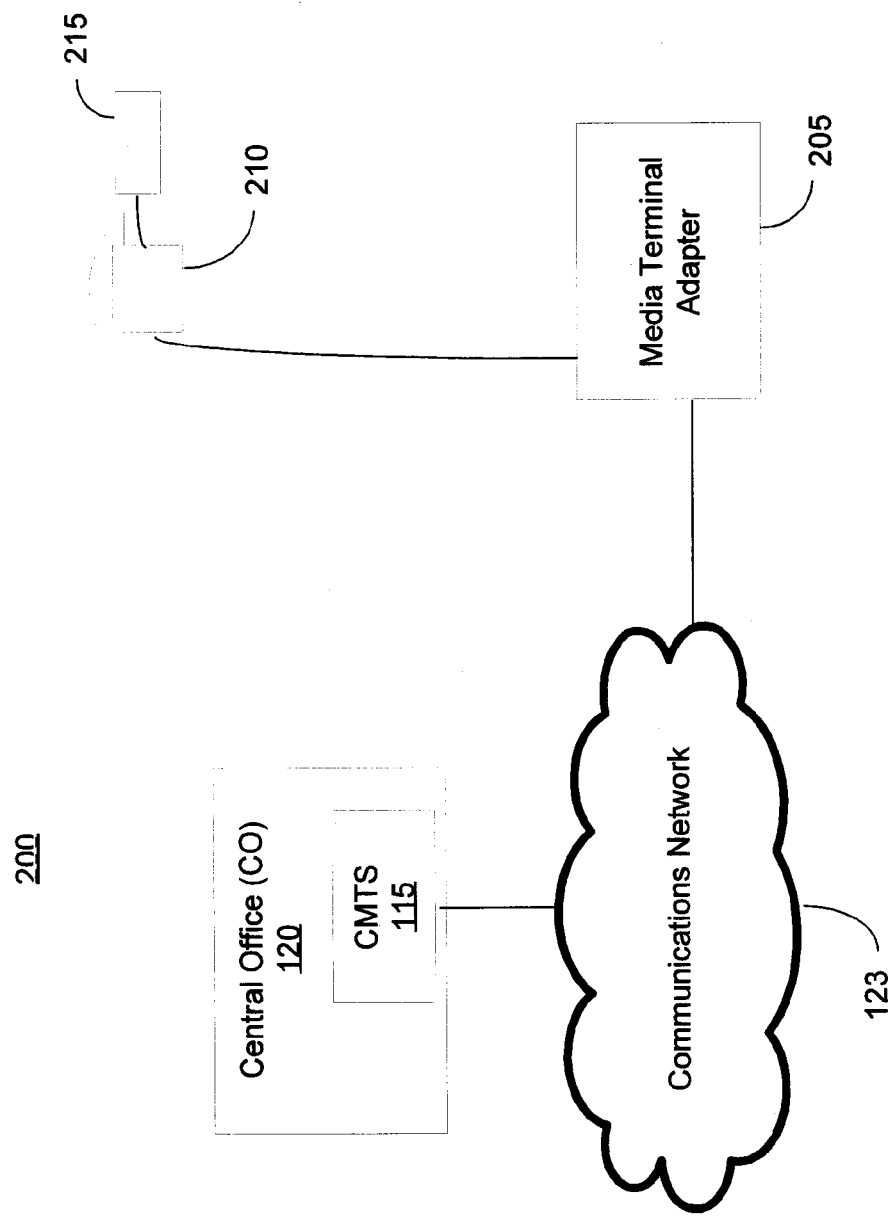
FIG. 2 is a block diagram of a communications system including an MTA that is coupled to a Type 1 or Type II caller identification telephone or caller identification box that is suitable for use in implementing the present invention.

FIG. 2 is a block diagram of a communications system 200 including an MTA 205 that is coupled to a Type 1 or Type II caller identification telephone 210, or caller identification box, that is suitable for use in implementing the present invention. The telephone 210 includes a display 215, which can either be part of the telephone or a separate display, that is traditionally used for displaying caller identification information, date and time information, or any received caller messages. In accordance with the present invention, the display 215 via the telephone 210 also is capable of receiving and displaying information from the MTA 205. Information may include steps of the initialization process such as passed, failed due to a stated reason, or passed with errors, for example. Additional information may be the firmware and/or software load versions of the MTA 205. It will be appreciated that the information is configurable and can include messages from just key steps of the process to every step of the process along with other programmable information or data coming from either the MTA itself or from the CMTS.

Figure 3:
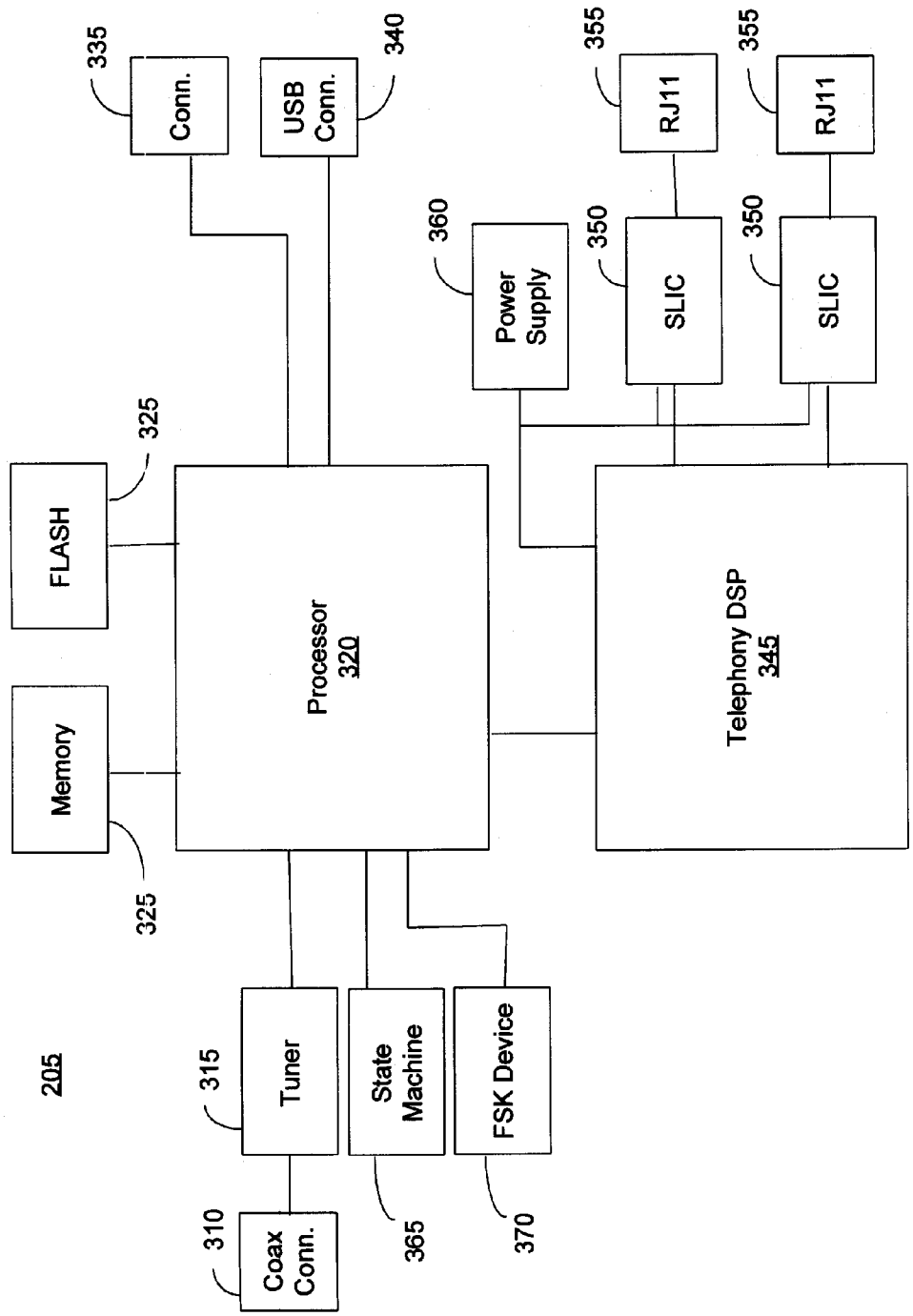
FIG. 3 is a block diagram of the MTA that is suitable for use in the system of FIG. 2.

FIG. 3 is a block diagram of the MTA that is suitable for use in the system of FIG. 2. A coaxial F connector 310 connects the MTA 205 to the communications network 123. A tuner 315 then receives and filters data intended for the MTA 205 and routes the data to a processor 320. If the data is intended for a coupled computer, the processor 320 routes the data to either an Ethernet connector 335 or a USB connector 340 depending upon the application. If the data is telephony data, the data is routed to a telephony digital signal processor (DSP) 345 for further processing, such as code decoding, packetization, echo cancellation, or other telephone signal processing. The telephony data is then routed to a connected telephone 210 via a subscriber line interface chip (SLIC) 350. The telephone 210 is typically connected to the MTA 205 with CAT-3 or CAT-5 wiring and an RJ11 telephone jack 355. The MTA 205 also includes a power supply 360 for powering the telephony DSP 345 and the SLICs 350 as well as memory 325, such as SDRAM and Flash memory, for system storage purposes.

In accordance with the present invention, the MTA 205 also includes a state machine 365 coupled to the processor 320 for tracking steps completed in the initialization process. A frequency shift keying (FSK) converter 370 converts the data received from the state machine and other information that may be generated by the MTA 205 or received from the CMTS 115 into ones and zeros that can be provided to the telephone 210, where FSK data is then interpreted and displayed in a readable format. Additionally, during the initialization process, the processor 320 activates the SLIC 350, which is the connection point between the MTA 205 and the telephone 210, during the initialization process. Conventionally, the SLIC 350 is inactive until such time as the initialization process is complete and communications have been established between the MTA 205 and the CMTS 115.

Figure 4:
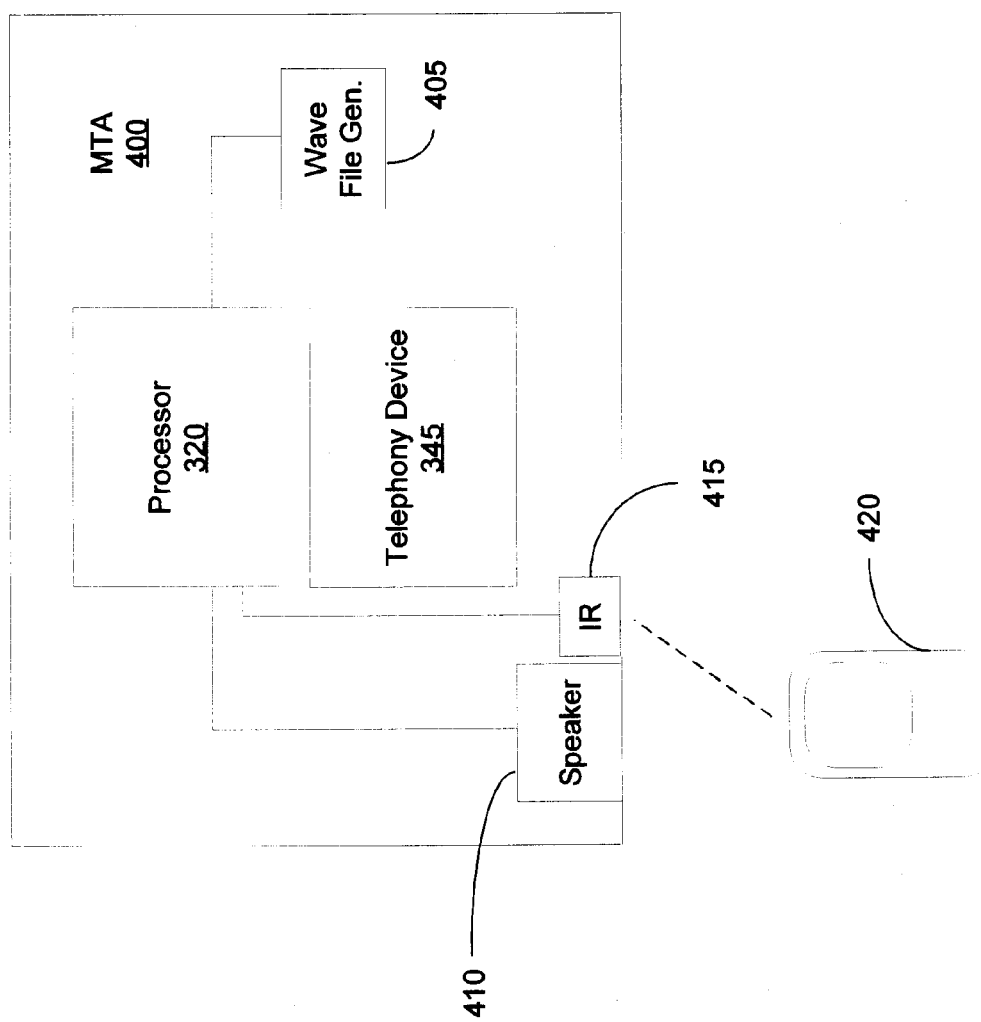
FIG. 4 is a block diagram of an MTA, which is a modified MTA of FIG. 3, in accordance with the present invention.

FIG. 4 is a block diagram of an MTA 400, which is a modified MTA 205 of FIG. 3, in accordance with the present invention. The MTA 205 of FIG. 3 may also include a wave file generator 405 that accommodates data generated by the state machine 365. More specifically, depending upon the steps completed as noted by the state machine 365 or other received information, a wave file generator 405 generates an embedded audio file using an audio format (e.g., .wav, .mp3, etc.) that may be transmitted to a speaker 410 included in the MTA 400. Alternatively, the audio file can be provided to the telephone 210 for hearing through the handset. In this manner, the wave file generator 405 can be used in conjunction with or as an alternative to the display on a caller identification telephone or box. Additionally, an IR transceiver 415 may also be coupled to the processor 320 for communicating IR signals that correspond to the initialization. The IR signals can then be transmitted to or received from an IR handheld device 420 for display.

In a first implementation of the present invention, information can be displayed on the telephone 210 by enabling the function via a management information base (MIB) object. More specifically, in accordance with the present invention, certain events are included in a MIB table, which is stored in memory 325, that correspond to the initialization process and other information. When the processor 320 receives a response from a state machine 365 indicating that a step is complete, the processor 320 retrieves a corresponding MIB from memory 325 and converts the step into an FSK format via an FSK device 370. FSK data is then provided to the display 215 via the telephony DSP 345 and the SLIC(s) 350. Additionally, when the processor 320 receives information about the firmware version, for example, the information is provided to the FSK device 370 for conversion and then to the telephone 210 for display.

In a second implementation, a specific digit string corresponding to the initialization steps is stored in a digit map. A technician or customer can then determine which step has been completed at any time throughout the initialization process by picking up a telephone handset, dialing the specific digit string, and hanging up the telephone handset. Once the handset is hung up, the processor 320 accesses the last completed step from the state machine 365, converts the step into FSK data, and then provides the information to the display 215. Furthermore, in a third implementation, the specific digit string can be used with the handset off the hook. Similar to the above embodiment, the handset is removed from the hook and the digit string is entered. The data is then retrieved from the state machine 365 and provided to the display 215 even while the handset remains off-hook.

It will be appreciated that each of the methods may be used singly or in conjunction with one another. For example, there may be a MIB associated with each reporting selection: 1) a first MIB to enable the display of the initialization process via the caller identification mechanism and uses FSK data to display on the telephone display; 2) a second MIB to enable the audio annunciation of the initialization process via an audio file that is heard from either the telephone 210 or from the MTA 205; 3) a third MIB to enable the transmission of the initialization process to the handheld transmitter/receiver 420; and 4) a fourth MIB to set the digit string used for starting and/or stopping the initialization process reporting. As mentioned, the reporting may include all, some, none of the steps, or other displayable information.

Accordingly, systems and methods have been provided that enables an MTA to gather and report information to a connected telephone display, an IR or wired handheld display device, or a speaker It will be appreciated that further embodiments are envisioned that implement the invention, for example, using all software or adding modes for additional features and services.

What is claimed is:

1. A method for displaying information received or generated by a media terminal adapter on a display, the method comprising the steps of:
   receiving, at a tuner internal to the media terminal adapter, data from a cable modem termination system (CMTS) during initialization process for the media terminal adapter;
   filtering the received data to identify data intended for the media terminal adapter;
   providing the filtered data and a set of state machine information to a processor, wherein the state machine is internal to the media terminal adapter, and wherein the state machine information includes at least status of steps of an initialization process, the firmware load version, and the software load version of the media terminal adapter;
   converting the filtered data and the state machine information to a frequency shift keying (FSK) format to provide an FSK data signal;
   providing the FSK data signal to an interface; and
   displaying the FSK data signal on a display device in a readable format.

2. The method of claim 1, wherein the interface is an infrared (IR) transmitter and receiver interface.

3. The method of claim 1, wherein the interface is a subscriber line interface chip coupled to a telephone jack.

4. The method of claim 1, wherein the display device is a telephone having a caller identification display.

5. The method of claim 1, wherein the display device is a handheld display device.

6. The method of claim 1, wherein converting the information to the FSK format comprises:
   defining a management information base (MIB) table in a memory on the media terminal adapter for all state machine information, retrieving, from the memory, a corresponding MIB for the set of state information;

converting the retrieved MIB to an FSK signal.

7. The method of claim 1, further comprising the steps of:

defining a digit string associated with the information; and entering the digit string, wherein the step of converting the information to an FSK signal is completed when the digit string is entered.

8. The method of claim 7, wherein the digit string is entered by one of a coupled telephone or a handheld device.

9. A method for displaying media terminal adapter process steps and other data on a display, the method comprising the steps of:

receiving, at a tuner internal to the media terminal adapter, data from a cable modem termination system (CMTS) during initialization process for the media terminal adapter;

filtering the received data to identify data intended for the MTA;

providing the filtered data and all process steps received from a state machine associated with the media terminal adapter to a processor, wherein the process steps includes at least steps of an initialization process, the firmware load version, and the software load version of the media terminal adapter;

converting the filtered data and the at least one process step to a wave file;

providing the wave file to a speaker; and playing the wave file in an audible format.

10. The method of claim 9, wherein the speaker is included in at least one of the media terminal adapter and a coupled telephone.

11. The method of claim 9, further comprising defining a management information base (MIB) for the at least one process step, wherein the step of converting the at least one process step to the wave file is completed when the MIB is enabled.

12. The method of claim 9, further comprising:

defining a digit string associated with the at least one process step; and entering the digit string, wherein the step of converting the at least one process step to a wave file is completed when the digit string is entered.

13. The method of claim 12, wherein the digit string is entered by one of a coupled telephone or a handheld device.

14. A media terminal adapter (MTA) for performing a process, wherein the process includes a plurality of steps, and for generating information, the MTA comprising:

a tuner internal to the media terminal adapter, configured to receive data from a cable modem termination system (CMTS) during initialization process for the MTA, and filter the received data to identify data intended for the MTA;

a state machine for tracking and reporting each of the plurality of steps, wherein the plurality of step and generated information includes at least steps of an initialization process, the firmware load version, and the software load version of the media terminal adapter;

a frequency shift keying (FSK) device for converting the filtered data, each of the reported plurality of steps and generated information into an FSK signal; and a display device for receiving and displaying each of the FSK signals.

15. The MTA of claim 14, wherein the display device is one of a telephone having a caller identification display and a handheld display device.

16. The MTA of claim 14, further comprising a processor for defining and enabling a management information base (MIB) for reporting each of the plurality of steps in the process and generated information.

17. The MTA of claim 14, further comprising a processor for defining a digit string corresponding to the process, wherein when the digit string is entered, the display device receives each of the FSK signals.

18. The MTA of claim 17, wherein the digit string is entered via one of a coupled telephone or a handheld display device.

19. A media terminal adapter (MTA) for performing a process, wherein the process includes a plurality of steps, and for generating information, the MTA comprising:

a tuner, internal to the media terminal adapter, configured to receive data from a cable modem termination system (CMTS) during initialization process for the media terminal adapter, and filter the received data to identify data intended for the media terminal adapter;

a state machine for tracking and reporting each of the plurality of steps, and wherein the information includes at least steps of an initialization process, the firmware load version, and the software load version of the media terminal adapter;

a wave file generator for converting the filtered data, each of the reported plurality of steps and generated information into an audio signal; and a speaker for receiving and playing the audio signal.

20. The MTA of claim 19, wherein the speaker is included in at least one of the MTA and a telephone.

21. The MTA of claim 19, further comprising a processor for defining and enabling a management information base (MIB) for reporting each of the plurality of steps in the process and generated information.

22. The MTA of claim 19, further comprising a processor for defining a digit string corresponding to the process, wherein when the digit string is entered, the speaker receives the audio signal.

* * * * *